United States Patent
Pires De Vasconcelos et al.

(10) Patent No.: US 9,046,626 B2
(45) Date of Patent: Jun. 2, 2015

(54) PERFORMING REVERSE TIME IMAGING OF MULTICOMPONENT ACOUSTIC AND SEISMIC DATA

(75) Inventors: Ivan Pires De Vasconcelos, Coton (GB); James E. Rickett, Cambridge (GB)

(73) Assignee: WESTERNGECO L.L.C., Houston, TX (US)

(*) Notice: Subject to any disclaimer, the term of this patent is extended or adjusted under 35 U.S.C. 154(b) by 142 days.

(21) Appl. No.: 13/345,412

(22) Filed: Jan. 6, 2012

(65) Prior Publication Data

US 2012/0183176 A1    Jul. 19, 2012

Related U.S. Application Data

(60) Provisional application No. 61/431,131, filed on Jan. 10, 2011.

(51) Int. Cl.
*G06K 9/00* (2006.01)
*G01V 1/38* (2006.01)

(52) U.S. Cl.
CPC .......... *G01V 1/38* (2013.01); *G01V 2210/679* (2013.01)

(58) Field of Classification Search
USPC ........................................ 382/103
See application file for complete search history.

(56) References Cited

U.S. PATENT DOCUMENTS

| | | | |
|---|---|---|---|
| 5,999,488 A | 12/1999 | Smith | |
| 7,254,091 B1 | 8/2007 | Gunning et al. | |
| 7,675,815 B2 | 3/2010 | Saenger et al. | |
| 7,872,942 B2 | 1/2011 | Söllner | |
| 8,451,687 B2 * | 5/2013 | Kitchenside et al. | 367/73 |
| 2009/0109794 A1 | 4/2009 | Sinha | |
| 2009/0292475 A1 | 11/2009 | Alam et al. | |
| 2010/0110830 A1 | 5/2010 | Thomson | |
| 2010/0161233 A1 | 6/2010 | Saenger et al. | |
| 2010/0202250 A1 | 8/2010 | Kitchenside et al. | |
| 2011/0276273 A1 * | 11/2011 | Artman et al. | 702/16 |
| 2011/0288831 A1 * | 11/2011 | Tan et al. | 703/2 |
| 2014/0043934 A1 | 2/2014 | Vasconcelos | |
| 2014/0043939 A1 | 2/2014 | Vasconcelos | |

FOREIGN PATENT DOCUMENTS

| | | |
|---|---|---|
| WO | 2011049654 | 4/2011 |
| WO | 2012096871 | 7/2012 |
| WO | 2012160430 | 11/2012 |

OTHER PUBLICATIONS

Fleury, et al., "Investigating an Imaging Condition for Nonlinear Imaging—Principles and Application to Reverse-timemigration Artifacts Removal", SEG Annual Meeting, Denver, Colorado, Oct. 17-22, 2010, 6 pages.
Halliday, et al., "An interferometric theory of source-receiver scattering and imaging", Geophysics, vol. 75 (6), 2010, pp. SA95-SA103.

(Continued)

*Primary Examiner* — Tom Y Lu

(57) ABSTRACT

A technique includes performing reverse time imaging to determine an image in a region of interest. The reverse time imaging includes modeling a pressure wavefield and a gradient wavefield in the region of interest based at least in part on particle motion data and pressure data acquired by sensors in response to energy being produced by at least one source.

20 Claims, 5 Drawing Sheets

(56) References Cited

OTHER PUBLICATIONS

Lindwall, Dennis, "3D underwater imaging using vector acoustic sensors", Geophysics, vol. 73 (1), 2008, pp. Q1-Q7.

Vasconcelos, et al., "Nonlinear extended images via image-domain interferometry", Geophysics, vol. 75 (6), 2010, pp. SA105-SA115.

Vasconcelos, et al., "Wave-equation Extended Images Via Image-domain Interferometry", Society of Exploration Geophysicists, vol. 28, 2009, 4 pages.

International Search Report of PCT Application No. PCT/IB2012/000972 (IS110173WOPC) dated Jan. 2, 2013: pp. 1-3.

International Search Report of PCT Application No. PCT/IB2012/000970 (IS12.2537WOPC) dated Jan. 2, 2013: pp. 1-4.

Vasconcelos et al., "Representation theorems and Green's function retrieval for scattering in acoustic media," Physical Review E, 2009, vol. 80: pp. 036605-1-036605-14.

* cited by examiner

PERFORMING REVERSE TIME IMAGING OF MULTICOMPONENT ACOUSTIC AND SEISMIC DATA

This application claims benefit under 35 U.S.C. §119(e) of U.S. Provisional Patent Application Ser. No. 61/431,131, entitled, "Source-Receiver Reverse-Time Imaging of Pressure and Gradient Data," filed Jan. 10, 2011, which is hereby incorporated by reference in its entirety.

BACKGROUND

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel. Other types of configuration are possible (such as a survey using a seabed cable, for example).

SUMMARY

In an embodiment, a technique includes performing reverse time imaging to determine an image in a region of interest. The reverse time imaging includes modeling a pressure wavefield and a gradient wavefield in the region of interest based at least in part on particle motion data and pressure data acquired by sensors in response to energy being produced by at least one source.

Advantages and other desired features will become apparent from the following drawing, description and claims.

DETAILED DESCRIPTION

Figure 1:
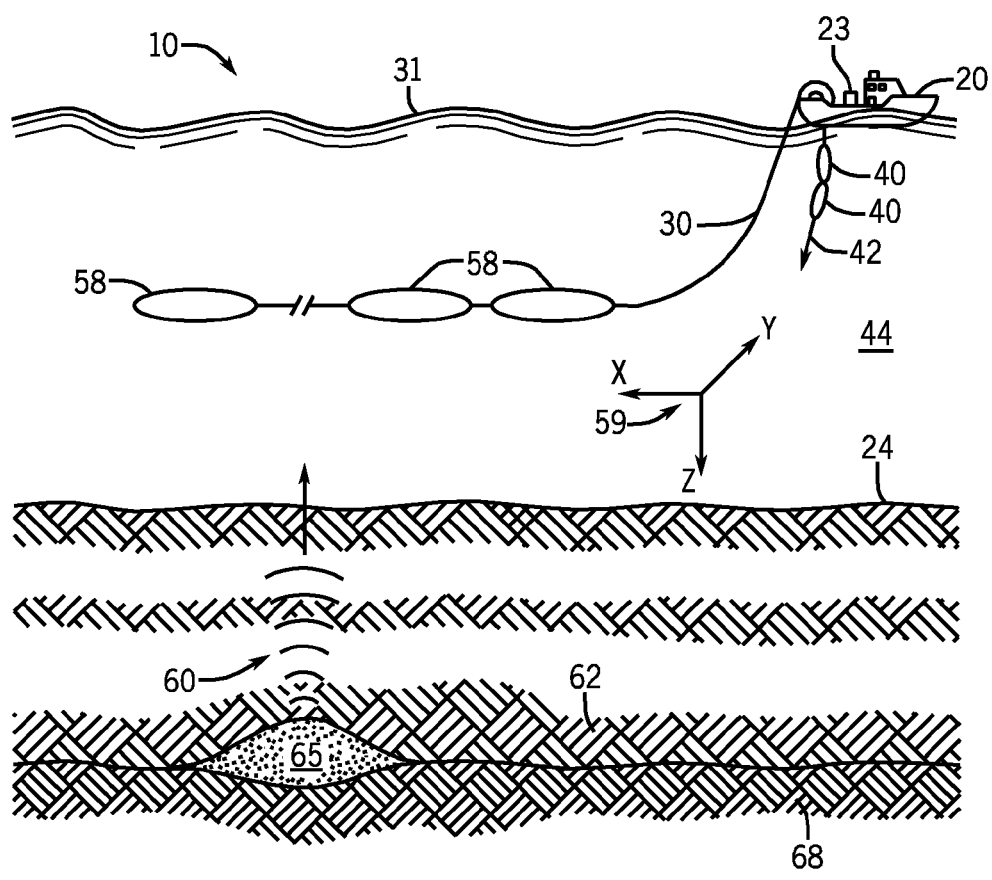
FIG. 1 is a schematic diagram of a seismic acquisition system according to some embodiments.

Seismic sensors may be deployed in cable in a number of different seismic data acquisition systems, such as in marine-based seismic data acquisition systems in which one or more seismic streamers are towed or seabed cables are positioned on the seabed; or in well-based seismic data acquisition systems in which one or more seismic sensor cables extend into a wellbore. As a non-limiting example, FIG. 1 depicts a marine-based, towed seismic data acquisition system 10, which includes a survey vessel 20 that tows one or more seismic streamers 30 (one streamer 30 being depicted in FIG. 1, as a non-limiting example) behind the vessel 20. It is noted that the streamers 30 may be arranged in a spread in which multiple streamers 30 are towed in approximately the same plane at the same depth. As another non-limiting example, the streamers may be towed at multiple and/or variable depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensors 58, such as pressure and particle motion sensors that are constructed to acquire pressure data and particle motion data, respectively.

The marine seismic data acquisition system 10 further includes seismic sources 40 (two seismic sources 40 being depicted in FIG. 1, as an example), such as air guns and the like. In some embodiments, the seismic sources 40 may be coupled to, or towed by, the survey vessel 20. In further embodiments, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an acoustic signal 42 being depicted in FIG. 1, as an example), often referred to as "shots," are produced by the seismic sources 40 and are directed down through a water column 44 into strata 62 and 68 beneath a water bottom surface 24. The acoustic signals 42 are reflected from the various subterranean geological formations, such as, for example, a geological formation 65 that is depicted in FIG. 1.

The incident acoustic signals 42 that are created by the sources 40 produce corresponding reflected acoustic signals, or pressure waves 60, which are sensed by the seismic sensors 58. It is noted that the seismic waves that are received and sensed by the seismic sensors 58 include "up going" seismic waves that propagate to the sensors 58 after reflections at the subsurface, as well as "down going" seismic waves that are produced by reflections of the pressure waves 60 from an air-water boundary, or free surface 31.

The seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments. For example, a particular seismic sensor 58 may be a hydrophone that provides a trace, which corresponds to a measure of a pressure wavefield; and another sensor 58 may provide (depending on the particular embodiment) one or more traces that correspond to one or more measured components of particle motion.

The goal of the seismic acquisition is to build up an image of a survey area for purposes of identifying subterranean geological formations, such as the geological formation 65, for example. Subsequent analysis of the representation may reveal probable locations of hydrocarbon deposits in subterranean geological formations. Depending on the particular embodiment, portions of the analysis of the representation may be performed on the seismic survey vessel 20, such as by the signal processing unit 23. In accordance with other embodiments, the representation may be processed by a seismic data processing system that may be, for example, located on land or on the vessel 20. Thus, many variations are possible and are within the scope of the appended claims.

Figure 2:
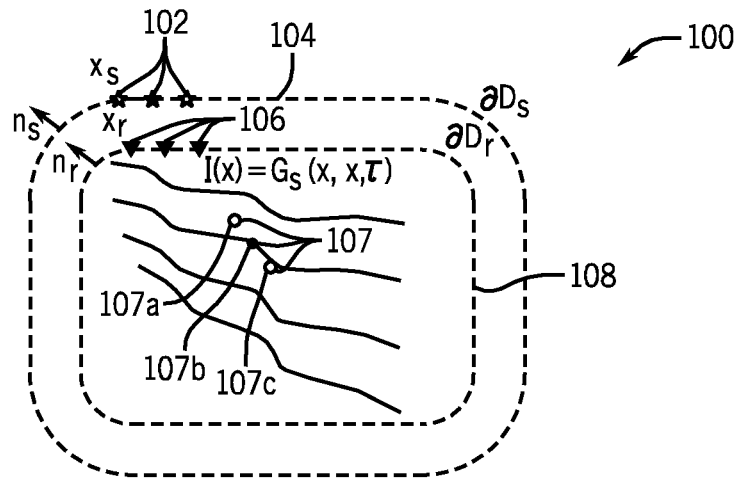
FIG. 2 illustrates a model for performing the reverse time imaging according to some embodiments.

Reverse time imaging may be used for purposes of constructing an image of a particular subterranean geologic region of interest based on the acquired seismic data. Although the seismic data may be processed for purposes of removing the free surface multiples and the ghost arrivals before performing the reverse time imaging, it has been discovered that the information that is present in the ghost and free surface multiple energy may aid in improving the quality of the image. Referring to FIG. 2, in accordance with some embodiments, an image (called "I(x)" or simply "I" herein) of a particular region of interest may be constructed using data acquired by particle motion and pressure sensors that are referred to as "receivers 106." The receivers 106 acquire particle motion and pressure measurements resulting from energy that is produced by sources 102 reflecting from various subsurface interfaces in the region of interest. As depicted in FIG. 2, the receivers 106 are associated with a corresponding boundary 108, and the sources 102 are denoted by a corresponding boundary 104, and in FIG. 2, normals to the source and receiver surfaces are denoted by $n_s$ and $n_r$, respectively. FIG. 2 also depicts arbitrarily chosen image points 107 (image points 107a, 107b and 107c being depicted as non-limiting examples), with example image points 107a and 107c representing an image of zero (i.e., an image away from interfaces or scatterers), and example image point 107d being a nonzero image point.

Figure 3:
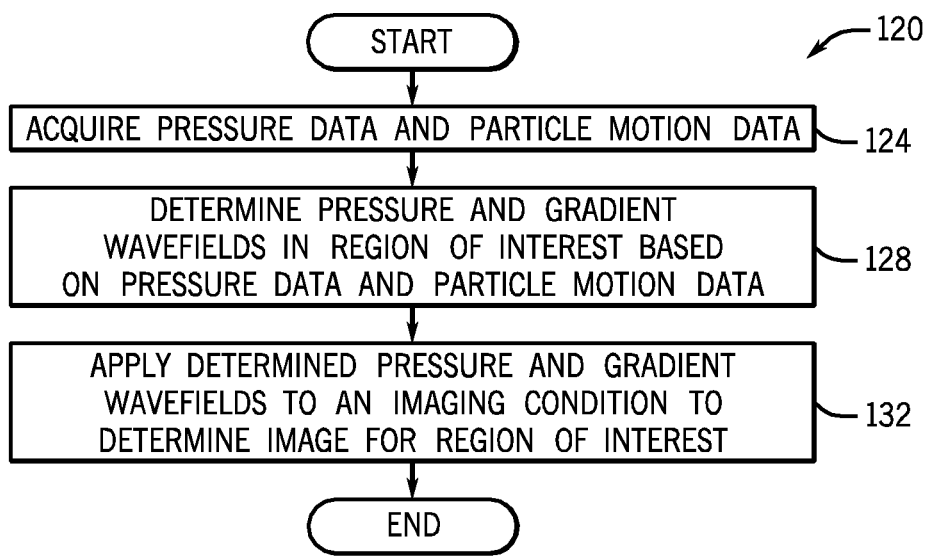
FIGS. 3, 4, 5, 6 and 7 are flow diagrams depicting reverse time imaging techniques using pressure and particle motion data according to some embodiments.

Referring to FIG. 3, in accordance with some embodiments disclosed herein, a technique 120 includes acquiring (block 124) pressure data and particle motion data and subsequently processing the acquired data to perform reverse time imaging to determine an image in a region of interest. More specifically, the technique 120 includes determining (block 128) pressure and gradient wavefields in a region of interest based on pressure and particle motion data and applying (block 132) the pressure and gradient wavefields to an imaging condition to determine the image for the region of interest.

As a non-limiting example of reverse-time imaging using multicomponent data, in general, the reverse time imaging disclosed herein involves determining a time domain-based total receiver wavefield ($G_S$) evaluated at time ($\tau$) zero:

$$G_S(x, x, \tau = 0), \qquad \text{Eq. 1}$$

where "x" represents an arbitrary position in the region of interest. In view of the total receiver wavefield $G_S(x, x_S, \tau=0)$, an imaging condition (called "$I_{grad}(x)$" herein) may be defined as follows for a nonlinear source-receiver migration:

$$I_{grad(x)} = \qquad \text{Eq. 2}$$

$$\left\{ \int 2\Re \left\{ \oint_{\partial D_s} \frac{1}{i\omega\rho} [\nabla_{x_s} G_S(x, x_S, \omega) G_0^*(x, x_S, \omega)] \cdot n_s d^2 x_s \right\} d\omega \right\} -$$

$$\left\{ \int 2\Re \left\{ \oint_{\partial D_s} \frac{1}{i\omega\rho} [G_S(x, x_S, \omega) \nabla_{x_s} G_0^*(x, x_S, \omega)] \cdot n_s d^2 x_s \right\} d\omega \right\} +$$

$$\int \left( \oint_{\partial D_s} \frac{1}{i\omega\rho} [\nabla_{x_s} G_S(x, x_S, \omega) G_S^*(x, x_S, \omega)] \cdot n_s d^2 x_s \right) d\omega -$$

$$\int \left\{ \oint_{\partial D_s} \frac{1}{i\omega\rho} [G_S(x, x_S, \omega) \nabla_{x_s} G_S^*(x, x_S, \omega)] \cdot n_s d^2 x_s \right\} d\omega,$$

where "$\omega$" represents the angular frequency; "$\rho$" represents the spatially-varying medium density at the source surface; "$\Re$" represents the real component; "$\nabla$" represents a gradient; "$\partial D_s$" represents the boundary of the region of interest (see also FIG. 2); "$n_S$" represents the normal to the source (see also FIG. 2); "$G_0$" represents the background model; and "*" represents the conjugation operator.

A simplified imaging condition (called "$I_{grad}^{RTM}(x)$" herein) for linear source-receiver migration may be described as follows:

$$I_{grad}^{RTM}(x) = G_S(x, x, \tau = 0) \approx \qquad \text{Eq. 3}$$

$$\int \left( \oint_{\partial D_s} \frac{1}{i\omega\rho} [\nabla_{x_s} G_S(x, x_S, \omega) G_0^*(x, x_S, \omega)] \cdot n_s d^2 x_s \right) d\omega -$$

$$\int \left( \oint_{\partial D_s} \frac{1}{i\omega\rho} [G_S(x, x_S, \omega) \nabla_{x_s} G_0^*(x, x_S, \omega)] \cdot n_s d^2 x_s \right) d\omega.$$

In Eqs. 2 and 3, the inner integral represents a summation over physical source positions, thereby denoting shot-profile imaging methods. The methods, however, may be also applied to a receiver profile geometry by interchanging the domains of integration between the imaging conditions in Eqs. 2 and 3 and the corresponding extrapolation integrals, which are discussed below. The outer integrals in Eqs. 2 and 3 denote an inverse Fourier transform, which is evaluated at zero time. It is noted that the gradients (denoted by the $\nabla_{x_s}$ operator) are evaluated with respect to the source coordinates.

Figure 4:
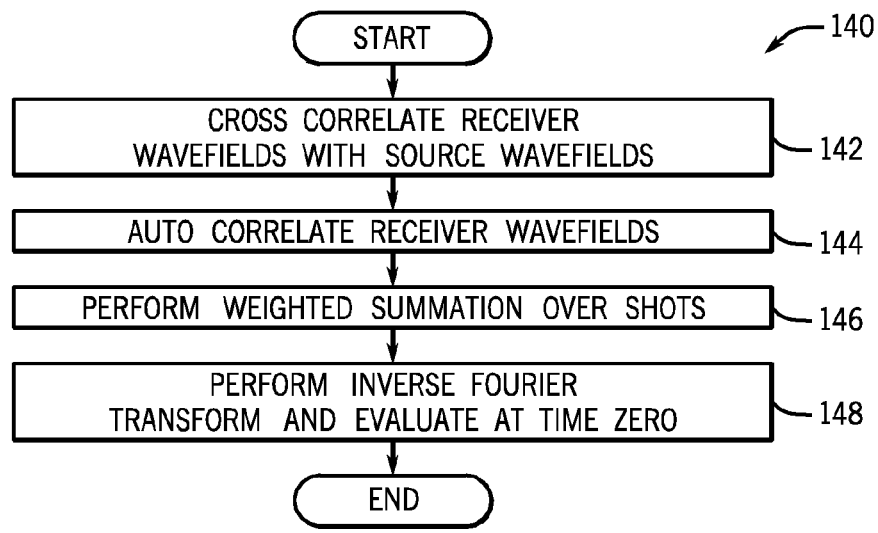

Equations 2 and 3 describe techniques for evaluating imaging conditions for linear and nonlinear reverse time migrations and cover various types of vector acoustic data as follows. More specifically, a technique 140 that is depicted in FIG. 4 may be used in accordance with Eqs. 2 and 3 to evaluate the imaging condition. Pursuant to the technique 140, the receiver wavefields are cross-correlated with the source wavefields, pursuant to block 142. In this regard, for nonlinear imaging, the terms of Eq. 2 set forth the cross-correlation for both pressure and dipole sources. For linear imaging for both pressure and dipole sources, both terms of Eq. 3 are used, which correspond to the first two terms of Eq. 2. For linear imaging from pressure only sources, only the second term in Eq. 3 is used; and for the linear imaging for dipole-only sources, only the first term in Eq. 3 is used.

Next, pursuant to the technique 140, in the case of nonlinear imaging, auto-correlations of the receiver wavefields are performed, pursuant to block 144. For nonlinear imaging for both pressure and dipole sources, all four terms of Eq. 2 are used; for nonlinear imaging from pressure only sources, the second and fourth terms of Eq. 2 are used; and for nonlinear imaging from dipole only sources, the first and third terms in Eq. 2 are used. Next, according to the technique 140, a weighted summation is performed over the shots, pursuant to block 146; and subsequently, an inverse Fourier transform is performed (block 148) and the result is evaluated at time zero.

It is noted that the imaging condition separates and controls the image contributions arising from the data from either monopole pressure sources; dipole or gradient pressure sources; or both types of sources. This holds true for both nonlinear imaging and reverse time migration using vector acoustic data. The imaging conditions take into account both pressure and dipole/gradient recordings from the receivers. The receiver dual field information, at this point, is implicitly accounted for in the extrapolated receiver fields, as further described below.

Secondly, it is noted that although it appears from comparison of Eqs. 2 and 3 that only the last two terms in Eq. 2 account for the nonlinearity in the imaging condition, in reality, all four terms of Eq. 2 account for the nonlinear behavior in the image. This happens because the $G_S$ fields in the integrands of Eqs. 2 and 3 are actually different: the receiver wavefields in Eq. 2 are obtained by nonlinear wavefield extrapolation and account for multiple scattering and nonlinear amplitude effects, while the waves in the receiver wavefields in Eq. 3 do not interact with the subsurface interfaces/scatterers during the extrapolation process.

The receiver and source wavefields may be extrapolated using the above-described imaging conditions, as set forth below. First set forth below is a description of a linearized wavefield extrapolation using vector acoustic data. The wavefield extrapolation obtains the subsurface domain wavefields that are present in the imaging conditions that are set forth in Eqs. 2 and 3. The linear receiver wavefield extrapolations receive the subsurface fields $G_S(x,x_S)$ from the actual data recorded between the physical sources $x_S$ and receivers $x_R$, as described below:

$$G_S(x, x_S, t = \tau) \approx \qquad \text{Eq. 4}$$

$$\int \left( \oint_{\partial \mathbb{D}_r} \frac{1}{i\omega\rho} [\nabla_{x_s} \nabla_{x_r} G_S(x_r, x_S, \omega) G_0^*(x, x_r, \omega)] \cdot n_r d^2 x_r \right)$$

$$e^{i\omega\tau} d\omega -$$

$$\int \left( \oint_{\partial \mathbb{D}_r} \frac{1}{i\omega\rho} [\nabla_{x_s} G_S(x_r, x_S, \omega) \nabla_{x_r} G_0^*(x, x_r, \omega)] \cdot n_r d^2 x_r \right)$$

$$e^{i\omega\tau} d\omega,$$

In Eq. 4, the integration is carried out over the receiver surfaces corresponding to each individual shot, and the gradients are taken with respect to receiver coordinates. The source-gradient receiver wavefield may be described as follows:

$$\nabla_{x_s} G_S(x, x_S, t = \tau) \approx \qquad \text{Eq. 5}$$

$$\int \left( \oint_{\partial \mathbb{D}_r} \frac{1}{i\omega\rho} [\nabla_{x_s} \nabla_{x_r} G_S(x_r, x_S, \omega) G_0^*(x, x_r, \omega)] \cdot n_r d^2 x_r \right)$$

$$e^{i\omega\tau} d\omega -$$

$$\int \left( \oint_{\partial \mathbb{D}_r} \frac{1}{i\omega\rho} [\nabla_{x_s} G_S(x_r, x_S, \omega) \nabla_{x_r} G_0^*(x, x_r, \omega)] \cdot n_r d^2 x_r \right)$$

$$e^{i\omega\tau} d\omega,$$

In Eqs. 4 and 5, "$G_S(x_r, x_S, \omega)$" represents a recorded receiver pressure wavefield due to a monopole pressure source; "$\nabla_{x_r} G_S(x_r, x_S, \omega)$" represents the acquired particle motion measurement of the gradient receiver wavefield due to the monopole pressure source; "$\nabla_{x_s} G_S(r_r, x_S, \omega)$" represents a measurement recorded by the pressure receivers due to a dipole pressure source; and "$\nabla_{x_s} \nabla_{x_r} G_S(x_r, x_S, \omega)$" represents the particle motion measurement by the receivers due to the dipole source.

Figure 5:
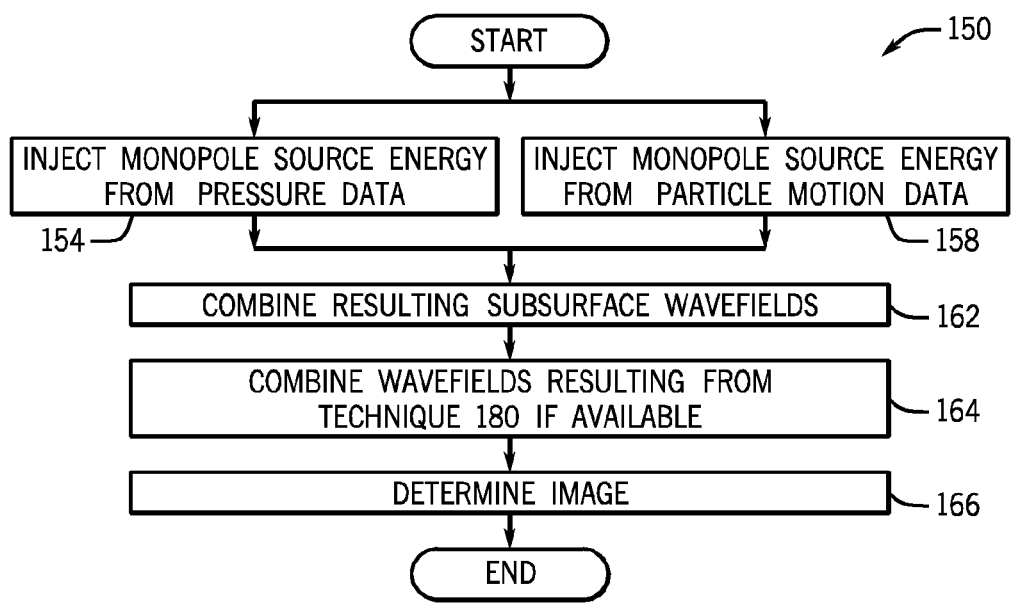

For purposes of performing the reverse time imaging, in accordance with some embodiments, monopole and dipole sources inject energy. The energy that is injected depends on the acquired pressure and partition motion data. For example, referring to FIG. 5, in view of Eqs. 4 and 5, a reverse time imaging technique 150 may be applied for purposes of determining an image using pressure and gradient measurements.

Figure 6:
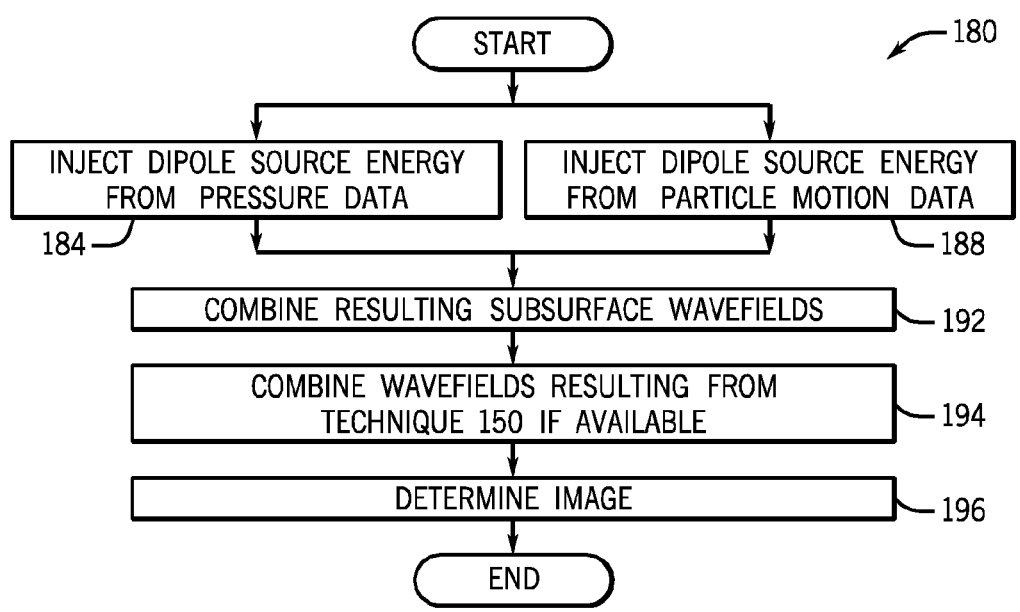

The technique 150 includes injecting monopole source energy based on pressure data, pursuant to block 154, and injecting monopole source energy based on particle motion data, pursuant to block 158. The resulting subsurface wavefields may then be combined, pursuant to block 162. Pursuant to block 166, an image may be determined based on the combined pressure wavefields derived in block 162 and, as also indicated in bock 164, possibly also based on combined pressure wavefields that are derived in a technique 180 (see FIG. 6).

The extrapolation of the source wavefields of, i.e., the wavefields denoted by "$G_O$," may be performed by forward simulation of the background responses with synthetic sources at each source location.

In further embodiments, dipole sources may inject energy based on the pressure and particle motion data. In this manner, referring to FIG. 6, in accordance with other embodiments, a reverse time imaging technique 180 includes injecting energy produced by dipole sources that are disposed at the boundary of the region of interest based on pressure data, pursuant to block 184, and injecting (block 188) energy that is produced by dipole sources that are disposed at the boundary of the region of interest based on particle motion data. The resulting subsurface wavefields may then be combined (block 192). Pursuant to block 196, an image may be determined based on the combined pressure wavefields derived in block 192 and, as also indicated in bock 194, possibly also based on combined pressure wavefields that are derived in the technique 150 (see FIG. 5).

As a non-limiting example, the nonlinear receiver wavefield extrapolation may be described as set forth below, in accordance with other embodiments:

$$G_S(x, x_S, t) + G(x, x_S, -t) = \qquad \text{Eq. 6}$$

$$\left\{ \int 2\Re \left\{ \oint_{\partial \mathbb{D}_r} \frac{1}{i\omega\rho} [\nabla_{x_r} G_S(x_r, x_S, \omega) G_0^*(x, x_r, \omega)] \cdot n_r d^2 x_r \right\} \right.$$

$$\left. e^{i\omega t} d\omega \right\} -$$

$$\left\{ \int 2\Re \left\{ \oint_{\partial \mathbb{D}_r} \frac{1}{i\omega\rho} [\nabla_{x_r} G_S(x_r, x_S, \omega) G_0^*(x, x_r, \omega)] \cdot n_r d^2 x_r \right\} \right.$$

$$\left. e^{i\omega t} d\omega \right\} +$$

$$\int \left( \oint_{\partial \mathbb{D}_r} \frac{1}{i\omega\rho} [\nabla_{x_r} G_S(x_r, x_S, \omega) G_S^*(x, x_r, \omega)] \cdot n_r d^2 x_r \right)$$

$$e^{i\omega t} d\omega -$$

$$\int \left\{ \oint_{\partial \mathbb{D}_r} \frac{1}{i\omega\rho} [\nabla_{x_r} G_S(x_r, x_S, \omega) G_S^*(x, x_r, \omega)] \cdot n_r d^2 x_r \right\}$$

$$e^{i\omega t} d\omega,$$

for the pressure receiver wavefield due to pressure sources, and $$\nabla_{x_S} G_S(x, x_S, t) + \nabla_{x_S} G(x, x_S, -t) = \qquad \text{Eq. 7}$$

$$\left\{ \int 2\Re \left\{ \oint_{\partial \mathbb{D}_r} \frac{1}{i\omega\rho} [\nabla_{x_r} G_S(x_r, x_S, \omega) G_0^*(x, x_r, \omega)] \cdot n_r d^2 x_r \right\} \right.$$

$$\left. e^{i\omega t} d\omega \right\} -$$

-continued $$\left\{ \int 2\mathrm{R} \left\{ \oint_{\partial \mathbb{D}_r} \frac{1}{i\omega\rho} [\nabla_{x_r} G_S(x_r, x_S, \omega) G_0^*(x, x_r, \omega)] \cdot n_r d^2 x_r \right\} \right.$$

$$e^{i\omega t} d\omega \Bigg\} +$$

$$\int \left( \oint_{\partial \mathbb{D}_r} \frac{1}{i\omega\rho} [\nabla_{x_r} G_S(x_r, x_S, \omega) G_S^*(x, x_r, \omega)] \cdot n_r d^2 x_r \right)$$

$$e^{i\omega t} d\omega -$$

$$\int \left\{ \oint_{\partial \mathbb{D}_r} \frac{1}{i\omega\rho} [\nabla_{x_r} G_S(x_r, x_S, \omega) G_S^*(x, x_r, \omega)] \cdot n_r d^2 x_r \right\}$$

$$e^{i\omega t} d\omega,$$

for the pressure receiver wavefield due to dipole sources.

Because the first two terms in Eqs. 6 and 7 are the real parts of the first two corresponding terms in Eqs. 4 and 5, the following technique may be used for nonlinear extrapolation, which jointly uses pressure and gradient data. First, the technique 150 (FIG. 5) or 180 (FIG. 6) may be performed using a reference part of a wavespeed model, which is a relatively smooth wavespeed model that has few or a limited number of discontinuities. From this extrapolation, the real part of the fields are determined, which provides the first two terms of Eqs. 5 and 6. Next, receiver wavefield extrapolation is performed, pursuant to either the technique 150 or 180 using the full wavespeed model. In this regard, the full wavespeed model contains all of the known/desired discontinuities. The fields extrapolated using the reference part of the wavespeed model are then subtracted from the fields extrapolated using the full wavespeed model, to yield the last two terms of Eqs. 6 and 7. Thus, these last terms are combined with the real parts to derive all of the components of Eq. 6 or 7.

Figure 7:
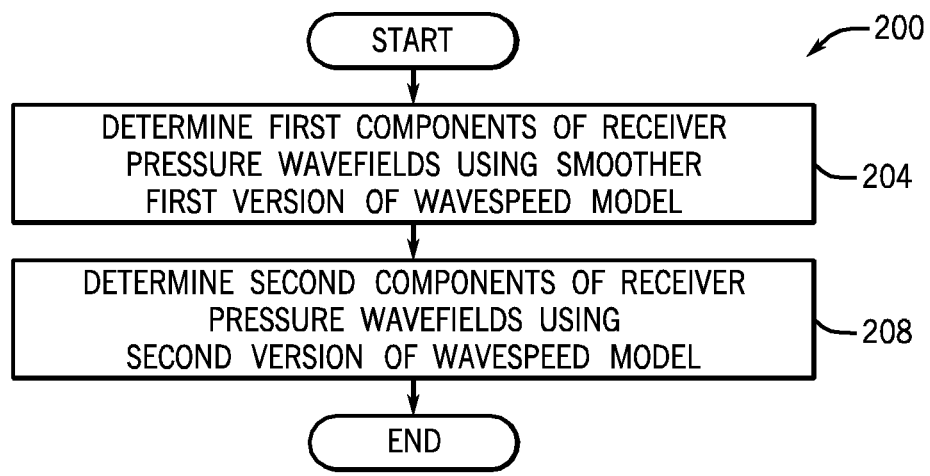

Referring to FIG. 7, thus, in accordance with embodiments, a technique 200 includes determining (block 204) first components of receiver pressure wavefields using a first version of a wavespeed model (a relatively smoother version or an initial baseline wavespeed model, as non-limiting examples) and subsequently determining (block 208) second components the receiver pressure wavefields using a second version of the wavespeed model (a relatively fuller, or complete, version, as a non-limiting example).

Figure 8:
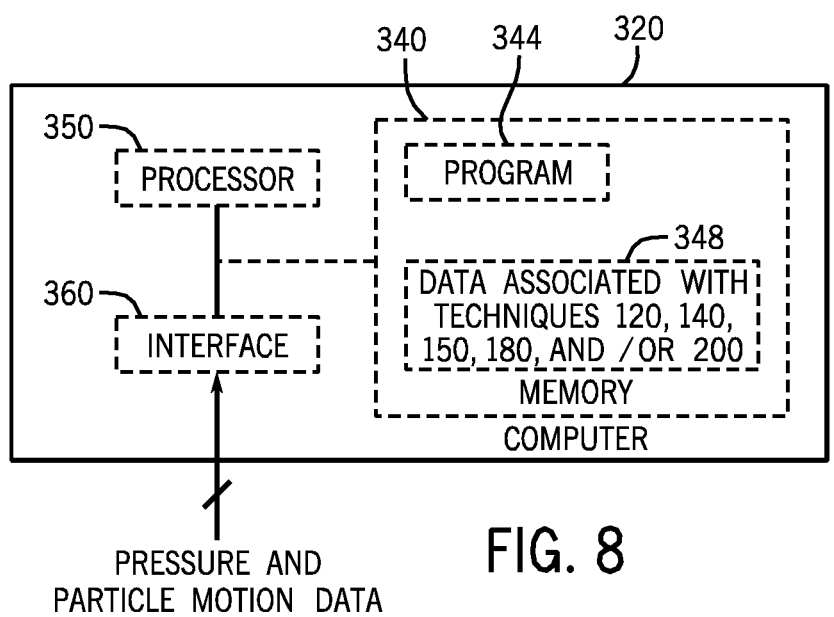
FIG. 8 is a schematic diagram of a data processing system according to some embodiments.

Referring to FIG. 8, in accordance with some embodiments, a data processing system 320, or computer, may contain a processor 350 for purposes of processing particle motion and pressure data for purposes of performing reverse time imaging to determine an image in a geological subterranean region of interest. In this manner, the processor 350 may acquire pressure data and particle motion data, determine pressure and gradient wavefields in a region of interest based on the pressure and particle motion data and apply the determined pressure and gradient wavefields to imaging condition to determine an image for a region of interest.

In accordance with some embodiments, the processor 350 may be formed from one or more microprocessors and/or microprocessor processing cores. As non-limiting examples, the processor 350 may be disposed on a streamer 30 (see FIG. 1), located on the vessel 20 (see FIG. 1), located at a land-based processing facility, disposed at a well site in which a sensor cable is deployed in a well, etc., depending on the particular embodiment. Moreover, the data processing system 320 may be a distributed processing system, in accordance with some embodiments.

As depicted in FIG. 8, the processor 350 may be coupled to a communication interface 360 for purposes of receiving pressure and particle motion data. As examples, the communication interface 360 may be a Universal Serial Bus (USB) interface, a network interface, a removable media interface (a flash card, CD-ROM interface, etc.) or a magnetic storage interface (IDE or SCSI interfaces, as non-limiting examples). Thus, the communication interface 360 may take on numerous forms, depending on the particular embodiment.

In accordance with some embodiments, the processor 350 is coupled to a memory 340, which stores program instructions 344, which when executed by the processor 350, may cause the processor 350 to perform various tasks of one or more of the techniques that are disclosed herein, such as the techniques 120, 140, 150, 180 and/or 200, as non-limiting examples. It is noted that the memory 340 is a non-transitory memory and may take on numerous forms, such as semiconductor storage, magnetic storage, optical storage, phase change memory storage, capacitor-based storage, etc., depending on the particular implementation. Furthermore, the memory 340 may be formed from more than one of these non-transitory memories, in accordance with some embodiments. When executing the program instruction 344, the processor 340 may also, for example, store preliminary, intermediate and/or final results obtained via the execution of the program instructions 344 as data 348 in the memory 340.

It is noted that the data processing system 320 is merely an example of one out of many possible architectures for processing the seismic data in accordance with the techniques that are disclosed herein. Moreover, the data processing system 320 is represented in a simplified form, as the processing system 320 may have various other components (a display to display initial, intermediate or final results of the system's processing, as a non-limiting example), as can be appreciated by the skilled artisan. Thus, many variations are contemplated and are within the scope of the appended claims.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
    performing reverse time imaging to determine an image in a region of interest, the performing comprising modeling a pressure wavefield and a gradient wavefield in the region of interest based at least in part on measurement data comprising particle motion data and pressure data acquired by sensors in response to energy being produced by at least one source,
    wherein performing the reverse time imaging comprises:
        modeling an output of at least one monopole pressure source disposed at a boundary of the region of interest based on the measurement data; and
        modeling an output of at least one dipole pressure source disposed at the boundary based on the measurement data.

2. The method of claim 1, wherein the act of performing reverse time imaging further comprises:
    modeling a first subsurface wavefield produced by the at least one monopole pressure source based on the particle motion data; and
    modeling a second subsurface wavefield produced by the at least one dipole pressure source based on the pressure data.

3. The method of claim 1, wherein the act of performing the reverse time imaging further comprises:
modeling an injection of energy produced by the at least one monopole pressure source based on the pressure data; and
modeling an injection of energy produced by the at least one dipole pressure source based on the particle motion data.

4. The method of claim 1, wherein the act of performing the reverse time imaging further comprises extrapolating the pressure wavefield and the gradient wavefield from the particle motion data and the pressure data.

5. The method of claim 1, wherein the act of performing the reverse time imaging further comprises applying an imaging condition relating the pressure wavefield and the gradient wavefield to the image.

6. The method of claim 1, wherein the act of performing the reverse time imaging further comprises applying a wavespeed model for the region of interest.

7. The method of claim 1, wherein the act of performing the reverse time imaging further comprises processing seismic data.

8. The method of claim 1, wherein the act of performing the reverse time imaging further comprises processing acoustic data.

9. A system comprising:
an interface adapted to receive measurement data comprising particle motion data and pressure data acquired by sensors in response to energy being produced by at least one source; and
at least one processor adapted to:
process the measurement data to model a pressure wavefield and a gradient wavefield in a reverse time imaging to determine an image of a region of interest;
model an output produced by at least one monopole pressure source disposed at a boundary of the region of interest based on the measurement data; and
model an output produced by at least one dipole pressure source disposed at the boundary based on the measurement data.

10. The system of claim 9, wherein the at least one processor is further adapted to:
model an injection of energy produced by the at least one monopole pressure source based on the particle motion data; and
model an injection of energy produced by the at least one dipole pressure source based on the pressure data.

11. The system of claim 9, wherein the at least one processor is further adapted to:
model an injection of energy produced by at least one monopole pressure source based on the pressure data; and
model an injection of energy produced by at least one dipole pressure source based on the particle motion data.

12. The system of claim 9, wherein the at least one processor is further adapted to:
extrapolate the pressure wavefield and the gradient wavefield from the particle motion data and the pressure data.

13. The system of claim 9, wherein the at least one processor is further adapted to apply an imaging condition relating the pressure wavefield and the gradient wavefield to the image.

14. An article comprising instructions stored on a non-transitory storage medium readable by a processor-based system that when executed by the processor-based system cause the processor-based system to:
receive measurement data comprising particle motion data and pressure data acquired by sensors in response to energy being produced by at least one source;
process the measurement data to model a pressure wavefield and a gradient wavefield in a reverse time imaging to determine an image of a region of interest;
model an output of at least one monopole pressure source disposed at a boundary of the region of interest based on the measurement data; and
model an output of at least one dipole pressure source disposed at the boundary based on the measurement data.

15. The article of claim 14, wherein the particle motion data and pressure data comprises data indicative of measurements acquired of energy produced by at least one seismic source.

16. The article of claim 14, wherein the particle motion data and pressure data comprises data indicative of measurements acquired of energy produced by at least one acoustic source.

17. A method comprising:
performing reverse time imaging to determine an image in a region of interest, the performing comprising modeling a pressure wavefield and a gradient wavefield in the region of interest based at least in part on particle motion data and pressure data acquired by sensors in response to energy being produced by at least one source,
wherein performing the reverse time imaging comprises:
determining receiver subsurface wavefields produced by at least one pressure source disposed at a boundary of the region of interest based at least in part on the pressure data and the particle motion data;
determining first components of the receiver subsurface wavefields based at least in part on a first version of a wavespeed model for the region of interest; and
determining second components of the receiver subsurface wavefields based at least in part on the second version of the wavespeed model for the region of interest different from the first version of the wavespeed model.

18. The method of claim 17, wherein the first version of the wavespeed model comprises a model selected from the group consisting a model that indicates relatively smooth wavespeed transitions as compared to wavespeed transitions indicated by the second version and an initial baseline wavespeed model.

19. A system comprising:
an interface adapted to receive particle motion data and pressure data acquired by sensors in response to energy being produced by at least one source; and
at least one processor adapted to:
process the particle motion data and the pressure data to model a pressure wavefield and a gradient wavefield in a reverse time imaging to determine an image of a region of interest;
determine receiver subsurface wavefields produced by at least one pressure source disposed at a boundary of the region of interest based at least in part on the pressure data and the particle motion data;
determine first components of the receiver subsurface wavefields based at least in part on a first version of a wavespeed model for the region of interest; and
determine second components of the receiver subsurface wavefields based at least in part on the second version of the wavespeed model for the region of interest different from the first version of the wavespeed model.

20. The system of claim 19, wherein the first version of the wavespeed model comprises a model selected from the group consisting a model that indicates relatively smooth wavespeed transitions as compared to than wavespeed transitions indicated by the second version and an initial baseline wavespeed model.

\* \* \* \* \*